(12) United States Patent
Cassone et al.

(10) Patent No.: US 8,055,546 B1
(45) Date of Patent: Nov. 8, 2011

(54) HABITUATION ORIENTED PRODUCT SELECTION SYSTEM

(75) Inventors: Deandra T. Cassone, Overland Park, KS (US); Douglas Michel Rossier, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 246 days.

(21) Appl. No.: 12/343,475

(22) Filed: Dec. 23, 2008

(51) Int. Cl.
*G06Q 30/00* (2006.01)

(52) U.S. Cl. .............. 705/26; 705/7; 705/8; 705/10; 707/100; 717/174; 713/155

(58) Field of Classification Search ............. 705/7–10; 707/100, 102; 713/155
See application file for complete search history.

(56) References Cited

U.S. PATENT DOCUMENTS

| | | | |
|---|---|---|---|
| 2003/0028451 A1* | 2/2003 | Ananian | 705/27 |
| 2006/0089837 A1* | 4/2006 | Adar et al. | 705/1 |
| 2006/0282660 A1* | 12/2006 | Varghese et al. | 713/155 |
| 2008/0162206 A1* | 7/2008 | Mak et al. | 705/7 |
| 2008/0228544 A1* | 9/2008 | Woosley et al. | 705/8 |
| 2008/0249868 A1* | 10/2008 | Angell et al. | 705/14 |
| 2009/0083122 A1* | 3/2009 | Angell et al. | 705/10 |
| 2009/0112648 A1* | 4/2009 | Lee et al. | 705/7 |

* cited by examiner

*Primary Examiner* — Vanel Frenel

(57) ABSTRACT

A processor-implemented method executing on a computer for using customer behavior to implement product design is provided. The method comprises the computer identifying a set of behavioral profiles that captures at least about sixty percent of a customer base, identifying products from a current offering that substantially match behavioral traits associated with each profile, and studying usage patterns of the products by customers, wherein the patterns are those of a plurality of customers using the products. The method also comprises the computer refining the profiles of the customers using the products, identifying underutilized features of the products based on patterns and one of discontinuing and repositioning the underutilized features, and identifying features indicated as desirable based on usage patterns and adding the features to the identified products; wherein the products comprise at least one of hardware, software executing on the hardware, and services associated with the use of the products.

20 Claims, 7 Drawing Sheets

FIG. 6
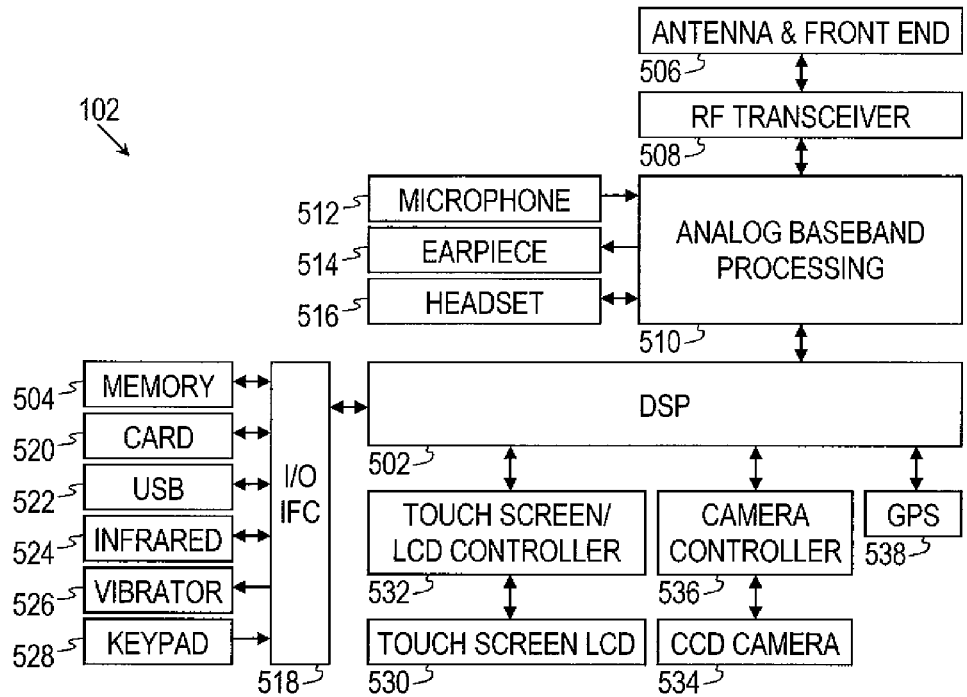
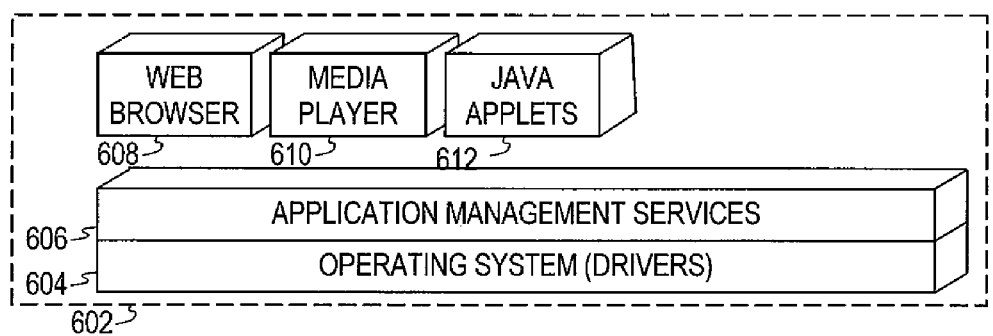
FIG. 7

HABITUATION ORIENTED PRODUCT SELECTION SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Vendors of electronic products often sell goods with as many features as they can profitably fit into their products. Many products are sold with so many features that models in a product line may overlap and customers have difficulty distinguishing between models and features, complicating purchase decisions. Service providers selling electronic products with subscription service plans may often make excessive services available, further complicating buyers' decisions. Manufacturers, service providers, and retailers may conduct marketing studies and surveys that segregate customers along socio-economic and demographic lines with accompanying tastes and preferences, often with little regard for specific user needs. Customers may then be placed in market segments determined by vendors, sometimes with minimal customer participation in the process. Using marketing strategies that include advertising, product placements, and price incentives, customers may then be directed to products that may be inappropriately targeted to them and are often loaded with features that overlook customers' fundamental needs. Customers may be confused and purchase products and services not well suited to their needs.

SUMMARY

In an embodiment, a processor-implemented method executing on a computer system for using customer behavior to implement product design is provided. The method comprises the computer system identifying a set of behavioral profiles that captures at least about sixty percent of a customer base, identifying products from a current product offering that substantially match behavioral traits associated with each behavioral profile, and studying usage patterns of the identified products by customers, wherein the usage patterns are those of a plurality of customers using the products. The method also comprises the computer system refining the behavioral profiles of the customers using the products, identifying underutilized features of the identified products based on usage patterns and one of discontinuing and repositioning the underutilized features, and identifying features indicated as desirable by customer behavior based on usage patterns and adding the features to the identified products; wherein the products comprise at least one of hardware, software executing on the hardware, and services associated with the use of the products.

In another embodiment, a processor-implemented method executing on a computer system is provided. The method comprises the computer system identifying a set of behavioral profiles that captures at least about sixty percent of a customer base, identifying products from a current product offering that substantially match behavioral traits associated with each behavioral profile, studying usage patterns of the products by customers, wherein usage patterns are those of a plurality of customers using the products, and refining the behavioral profiles of the customers using the products. The method also comprises the computer system studying usage patterns of the identified products by customers not using the identified products that match their behavioral profile and identifying features in products used by customers not using the products that match their behavioral profile, wherein the identified features are not present in the products that match their behavior profile. The method also comprises the computer system studying the usage of the features and refining product offerings by adding some of the identified features to the products used by customers using the products that match their behavioral profile; wherein the products comprise at least one of hardware, software executing on the hardware, and services associated with the use of the products.

In another embodiment, a processor-implemented method executing on a computer system is provided. The method comprises the computer system identifying a set of behavioral profiles that captures at least about sixty percent of a customer base, identifying products from a current product offering that substantially match behavioral traits associated with each behavioral profile, studying usage patterns of the products by customers, wherein usage patterns are those of a plurality of customers using the products, and refining the behavioral profiles of the customers using the products. The method also comprises the computer system identifying instances of potential product redundancy wherein at least two products from the current product offering are used by customers with the same behavioral profile, identifying products that do not match behavioral profiles, and refining product offerings by eliminating all but at least one of the products that redundantly serve the same behavioral profile and eliminating products determined to not align with a behavioral profile; wherein the products comprise at least one of hardware, software executing on the hardware, and services associated with the use of the products.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 6 is a block diagram of a mobile device according to an embodiment of the disclosure.

FIG. 7 is a block diagram of a software configuration for a mobile device according to an embodiment of the disclosure.

DETAILED DESCRIPTION

Figure 1:
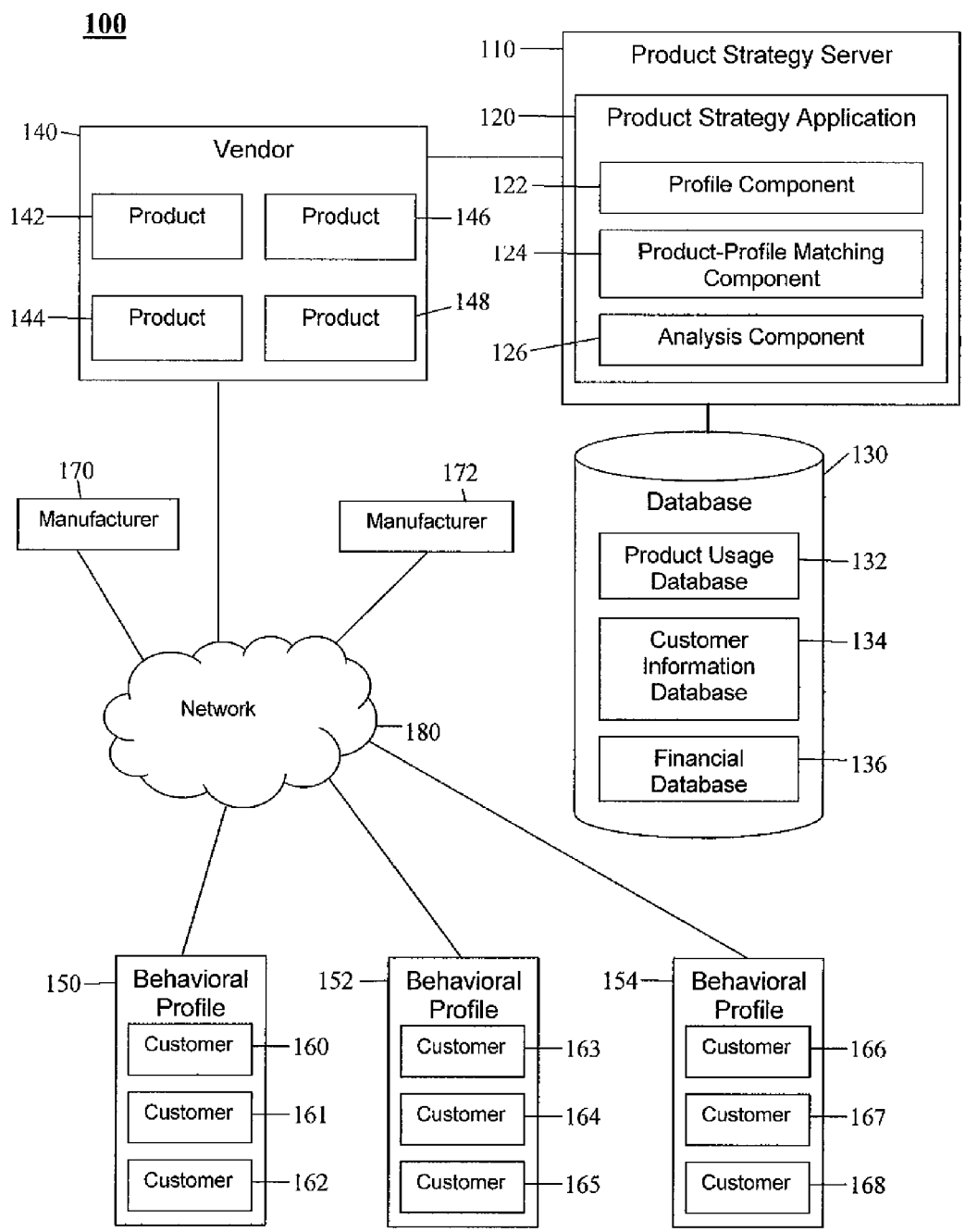
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Several embodiments of a habituation oriented product selection system permit a vendor to observe repeated customer usage habits of products, objectively identify behavioral traits or characteristics associated with established product usage patterns, and assemble groups of related behavioral traits into behavioral profiles. In an embodiment, a computer implemented method of habituation oriented product selection is taught, for example a computer program that executes on an appropriately loaded, configured computer system. The products may be any of consumer electronics products, home appliance products, personal apparel products, personal hygiene products, cosmetic products, and other products. Consumer electronics products may comprise televisions, personal computers, portable electronic devices such as mobile phones, personal digital assistants, laptop computers, tablet computers, and media players. Behavioral profiles are composed of related behavioral traits defined by observed user behavior. Behavioral traits are used to map specific users to behavioral profiles. The system promotes identification of the matching and/or alignment of products from a product line with the behavioral profiles. The alignment of products with behavioral profiles may then be used by the system to guide a user associated with a specific behavioral profile to specific products that align with the specific behavioral profile. Further, a vendor may then arrange its product offerings to align with the behavioral profiles, for example by redesigning the product offerings going forwards, and achieve a more focused and perhaps leaner product line. Offering fewer products that are more closely aligned to user habits and supporting those habits through product and feature positioning may build stronger customer loyalty. Habituation drives choice. When user habituation is properly supported by product alignment in this way, a product vendor may benefit from higher customer retention.

It is thought to be human nature that people prefer to follow their habits and are most comfortable when engaging in habitual behaviors. Engaging in new behaviors may demand intense mental focus and cause anxiety; people generally prefer to avoid anxiety. Consumers may establish a habit after only a few repetitions of a behavior, for example as few as about five to about seven repetitions. A vendor that can identify a habit of product usage in a customer can leverage that knowledge for retaining that customer by consistently delivering products to that customer that support the habitual product usage of that customer. Empirical data show that a user of a product, for example a mobile telephone, uses only a small number of features and generally uses the features in the same way.

Users of products, for example users of mobile telephones, may be advantageously identified with a small number of behavioral profiles and/or usage categories that may be identified initially by humans. These categories may be inferred from observing usage patterns, and these categories can be validated and refined. A vendor may identify usage habits in its customer base, develop preliminary behavioral profiles, and search its databases of product usage to determine how its products initially align with those preliminary behavioral profiles. Examples of preliminary behavioral profiles for a vendor of mobile telephones may be a businessman, mother, and teenaged user. These behavioral profiles may be defined and/or composed of observable traits, for example, an average number of phone calls per unit time, an average time duration of phone calls, a time distribution of phone calls, a ratio of data sessions to voice sessions, an average number of text messages (e.g., short message service (SMS) messages) per unit time, and other traits.

The vendor may use the product alignment information to modify and segment its behavioral profiles beyond these initial definitions. Specific user traits and characteristics may have become evident, and the vendor may determine which traits are commonly exhibited in the same customer. With the modified behavioral profiles, the vendor may again examine and analyze the product usage database and observe how products align with the adjusted behavioral profiles. With each iteration or cycle of adjusting behavioral profiles, analyzing product alignment to the adjusted behavioral profiles, and further adjusting behavioral profile definitions as user traits and their associations with each other become clearer, a vendor may determine which of its products align most closely with its refined behavioral profiles. In an embodiment, the cycle of analysis and adjustment may be at least partially automated for execution by a computer, for example, cycling based on a criteria or refinement objective. For example, the objective may be to identify at least five behavioral profiles and less than ten behavioral profiles, where 70% of customers may be aligned with one of the profiles, where the maximum under population and/or over population of any of the behavioral profiles is less than 2%, 5%, 10%, or some other effective percentage limit.

The vendor may identify correlations between user habits and the products demanded most often by the customers that persistently exhibit those habits, a correlation that can be leveraged to promote customer retention. The vendor may be able to identify its most committed customers and the products most important to those customers. A practical number of features appropriate to each category of customers or behavioral profile may also be identified as important. This process may also permit the vendor to identify products not closely aligning with any behavioral profiles, products that may overlap each other, and products that may be found to compete with each other. These products may represent candidates for repositioning with different pricing or advertising or may represent candidates for outright elimination. Eliminating redundant and/or products not directly aligned with a behavioral profile can reduce costs associated with supporting the eliminated products, for example, providing customer service and sales support for the eliminated products. Because a more focused, leaner, and perhaps smaller product line may be associated with a more manageable and less frequently changing knowledge base, the product line may be more easily supported by sales and support staff who may consequently provide better service. This approach may result in loss of some customers who wanted to purchase other products, for example other handsets or other features, but this may be an acceptable trade-off for the benefit of more securely binding the remaining customers through the links of habituation promoted and/or accommodated by tight alignment of products to the remaining customer base.

By also analyzing behavior of users who use products that the analysis suggests do not align with the behavioral profile describing those particular users, the vendor may discover features in the product chosen by the exceptional users that when added to the product that is aligned with the exceptional users' group, strengthens the product alignment with the behavioral profile. Similar to observing the development or failure of genetic mutations in a laboratory or in nature, some user behavior that departs from observed norms may prove beneficial toward the spawning of new products and furtherance of product evolution while other unexpected user behavior may constitute short-lived anomalies. Observing the behavior of users who experiment or accidentally try a product outside of the norm that proves successful may yield valuable product intelligence for a vendor. The information may provide forward looking insights, a glimpse into where the subject behavioral profile is evolving towards. The present disclosure may provide value to a vendor in identifying going forward new technologies and features that align with behavioral categories. The design of products themselves may be driven by this process. The steps of analysis progress from customers to behaviors and finally to products that may consist of mobile telephone handsets, but also couple the handsets with features and subscription plans into a stack of items that also may include installation, customer awareness, and payment and purchase methods.

Turning now to FIG. 1, a habituation oriented product selection system 100 is described. The system 100 comprises a product strategy server 110, a product strategy application 120, a database 130, a vendor 140, a product 142, a behavioral profile 150, a customer 160, and a manufacturer 170. In most embodiments, the system 100 also includes additional products 144, 146, 148, additional behavioral profiles 152, 154, additional customers 161, 162, 163, 164, 165, 166, 167, 168, and additional manufacturers 172. interactions of the product 142 may be taken as representative of the products 144, 146, 148. Interactions of the behavioral profile 150 may be taken as representative of the behavioral profiles 152, 154. Interactions of the customer 160 may be taken as representative of the customers 161, 162, 163, 164, 165, 166, 167, 168. Interactions of the manufacturer 170 may be taken as representative of manufacturer 172.

The product strategy server 110 may be any general purpose computer system. General purpose computer systems are discussed in greater detail hereinafter. The product strategy server 110 may comprise one computer or a plurality of computers, for example, a server farm wherein many server computers cooperate to share a processing load. The product strategy server 110 may comprise a plurality of computers that are located at different places, for example, to provide geographical diversity and increased service reliability. The product strategy server 110 executes one or more applications that provide services to the vendor 140 including hosting of the product strategy application 120.

In FIG. 1, the product strategy server 110 and the database 130 are coupled to the vendor 140. In an embodiment, the product strategy server 110 and the associated database 130 are owned and operated by the vendor 140 to develop its own product strategy and control its own product usage, customer, and financial information. In an embodiment, the product strategy server 110 and attached database 130 may be owned and/or operated by a third party such as a marketing consulting firm, a service bureau, or other entity acting in cooperation and under a contractual relationship with the vendor 140.

The product strategy application 120 executes on the product strategy server 110 and comprises several components that submit database queries to the database 130, process output received from the database 130 and other sources, create and modify behavioral profiles 150, match behavioral profiles 150 with products 142 and features, and provide output that may be useful in developing product strategy. The product strategy application 120 comprises the profile component 122 that creates, modifies, and deletes behavioral profiles 150. The profile component 122 submits queries to the database 130 and other sources and applies a variety of statistical methods to the output received from the database 130 and other sources to assess reliability of results and statistical validity of inferences made. The profile component 122 creates behavioral profiles 150 that comprise collections of traits exhibited by customers 160 in the repeated and prolonged usage of products 142. When the products 142 are mobile communications devices such as mobile telephones, the vendor 140 may be able to compile a great deal of data about user behavior and traits as nearly all user actions regarding such products 142 are directly entered into the product 142 via the keypad or microphone of the unit. The vendor 140, by tracking user activity, is able to determine over a period of time, for example, over a period of several weeks or several months, the habits and traits of a customer 160 in accessing services and features available.

In an embodiment, behavioral profiles 150 may initially be created by humans observing customer behavior and allocating observed behavioral traits into behavioral profiles. The profile component 122 may thereafter query the database 130 to generate outputs that permit adjustments and refinements of the initial behavioral profiles 150, for example in accordance with a criteria or objective for the behavioral profiles. A mobile telephone vendor, for example, may begin by identifying five initial behavioral profiles 150 comprising women, teenagers, technophiles who prefer to have the latest state-of-the-art devices, blue collar users who view their devices merely as a necessary evil, and business users. The profile component 122 would then generate information that could support, refute, and aid in the refinement of these initial behavioral profile definitions. The vendor could create a matrix listing these initial behavioral profiles 150 and associate each with such attributes as required strengths of device behavior, the typical user interaction with the device, pricing plans, primary advertising message, and projected upgrade cycle.

The profile component 122 submits queries to the database 130 that search for persistent patterns of customer behavior and related traits across all models of product 142. Similar or nearly identical customer behavior may be observed on widely different models of product 142. By contrast, a wide variety of usage behavior may be observed on a single model of product 142. Some features may be accessed repeatedly on certain products 142 while other features may be persistently ignored by customers 160. Analysts may find these patterns of usage occur more during certain periods than others. The function of the profile component 122 is to gather information about all usage trends on all products 142, aggregate the data, and support the creation of behavioral profiles 150 that describe about five behavior traits that the profile component 122 observes being persistently exhibited by a plurality of customers 160. A behavioral profile 150 comprises a gathering of traits exhibited by customers 160 and may not take into account traditional benchmarks such as demographics and geographic location. It may be discovered when customers 160 are associated with behavioral profiles 150 that a particular behavioral profile 150, for example, is associated with an unexpected collection of customers 160. Before behavioral profiles 150 are finalized and put into practice, statistical analysis may be performed to avoid inferring relationships between factors when in fact no such relationship may exist. In some contexts, this may be referred to as statistically validating and/or assessing the reliability of the behavioral profiles 150.

The profile component 122 may use regression analysis to support or refute a hypothesis about a relationship between two or more variables. A hypothesis might state that as personal income rises, the popularity of a certain mobile telephone feature also increases. Using personal income as the independent variable and frequency of selection of the certain feature as the dependent variable, a test could vary personal income and plot the corresponding sales figures for the feature on a graph. A possible correlation between the two variables could be determined by examining the standard deviation from the mean feature usage at each income level and determining the degree of linearity or other relationship, if any, between the two variables. If a valid relationship is found between the variables, conclusions drawn from the analysis about the purchasing and usage habits of customers at the observed income levels could be used to support the building of one or more behavioral profiles 150. Regression analysis may also be used to establish or refute a hypothesis regarding a causal relationship between variables. A mobile telephone provider may seek to determine if providing live telecasts of certain sporting events results in adult male users purchasing more of a certain model of mobile telephone or if adding bright colors such as pink and chartreuse to the list of available case colors of mobile telephones results in more purchases by teenage girls. Further statistical analysis could be performed with additional variables in the calculations to support inferences made about correlation or causal relationships between two or more variables.

Statistical analysis performed during the formulation of behavioral profiles 150 seeks to determine that customers are properly distributed across behavioral profiles 150. If, after initial creation of behavioral profiles 150, analysis reveals, for example, that half of an entire customer base is associated with a single behavioral profile 150 and the remaining fifty percent of the customer base appears to be randomly scattered across the other four of five behavioral profiles 150, further analysis may be necessary. Statistical techniques may be applied to determine that customers 160 are correctly clumped or clustered together in groups associated with behavioral profiles 150. Statistical techniques may also be employed to avoid such pitfalls of statistical analysis as falsely correlating behavioral traits. Statistically reliable behavioral profiles 150 are constructed and tested to avoid these pitfalls. Regression analysis with different combinations of variables used as the independent and dependent variables could be used to determine statistically significant and useful relationships between behavioral traits under consideration for inclusion in behavioral profiles 150 as well as reduce false conclusions regarding correlation. Field tests of prospective members of a behavioral profile 150 with some individuals receiving a feature or service, others not receiving the feature or service, and all other factors held constant with the resulting behavior analyzed may be statistically useful in setting the parameters of a behavioral profile 150.

Because mobile communications devices may provide a wide variety of features to customers 160 and have the potential to confuse customers 160, identifying popular features and eliminating or repositioning redundant or unpopular features is an important element of product design. Identifying specific features that are popular with customers 160 who share many of the same usage habits but are found to be using many models of product 142 may provide valuable input in decisions regarding eliminating or repositioning products 142 as well as features. Targeting a limited collection of desired features to a carefully identified behavioral profile 150 is an objective of the habituation oriented product selection system. A customer 160 using a flip-phone may desire different features from a customer 160 using a tablet computer who may desire different features from a customer using a personal digital assistant (PDA). A premise of the system is that positioning products 142 with carefully selected features directed to customers 160 associated with behavioral profiles 150 found to repeatedly use those features may allow for a much leaner and more profitable product line with a more clearly defined message to the customer base and stronger product evolution strategies. The profile component 122 submits a variety of queries to the database 130, analyzes the output, and assists in the development of the behavioral profiles 150.

The product strategy application 120 also comprises the product-profile matching component 124 that provides input on the correct products 142 and features within products 142 to target to specific behavioral profiles 150. Once behavioral profiles 150 have been established with the input of the profile component 122 and have been determined to be statistically reliable and relevant as well as having business value, the correct products 142 with the correct mix of features may be identified for targeting to the behavioral profiles 150. This process also may involve the application of statistical techniques because a vendor 140 may potentially have millions of customers and may sell scores of different models of products 142 with each product 142 uniquely offering a multitude of features. The product-profile matching component 124 may use data mining software to search the database 130 for associations between behavioral profiles 150, 152, 154 and usage of products 142 and features. The data mining software could be programmed to search for direct or inverse relationships between a variety of measures. The statistical significance and business value of any such relationships may then be established after further analysis. The product-profile matching component 124 conducts this analysis of aligning the products 142 and combinations of features with to the different behavioral profiles 150. The process may involve recommending that certain features be moved from one model of product 142 to another model, that certain features be created and added to certain models, that certain features be gathered from several models and combined in a new or existing model, and that certain features be eliminated entirely. This process of examining features is done in conjunction with examining models of product 142 using the same methodology. Once behavioral profiles 150 have been created and a vendor 140 is able to examine how its products 142 are being used by the customers 160 in the behavioral profiles 150, the vendor 140 may be surprised to discover, for example, that two or more similar models offering the same basic features are being used by customers 160 associated with a single behavioral profile 150. This may indicate to the vendor 140 that one or more of the models are redundant and may be repositioned by being priced differently, given a different marketing message, and/or marketed to a different behavioral profile 150. The redundant model may also be eliminated entirely. This insight may not have been readily seen by a vendor 140 without the use of the system 100 when previously marketing its products to customers grouped socio-economically, demographically, or by tastes and preferences perceived by the vendor 140 or the industry. The role of the product-profile matching component 124 is to assist in the identification of models of products 142 and features that are best targeted to specific behavioral profiles 150. An additional role is to identify situations in which models and features have been incorrectly positioned and are best repositioned, including being merged into other models and/or features, or eliminated entirely. The correct positioning of products 142, including the elimination of some products 142, may have a direct positive impact on the cost structure of a vendor 140 and consequently its profitability.

The product strategy application 120 also comprises the analysis component 126 that supports the product-profile matching component 124 in making its recommendations as well as performing operations with output from the database 130 that combine a wider variety of information not of primary concern to the profile component 122 and the product-profile matching component 124 as those components are concerned primarily with customers 160 and products 142. The analysis component 126 examines historical financial performance of models of products 142 and features including cost behavior and profitability. The analysis component 126 examines the profitability of different subscription plans for the various products 142 as the structure and positioning of these plans directly impact the profitability of products 142. The analysis component 126 also takes into account inventory matters, shipping arrangements, agreements with manufacturers 170, 172 and distributors, tax considerations, and export/import matters related to products 142. The analysis component 126 combines these additional considerations with basic customer usage and product data in providing an analysis to the vendor 140 for use by the vendor 140 in determining changes to the product 142 and feature positioning.

The database 130 is associated with the product strategy server 110 and provides data to the product strategy application 120 for its use in creating behavioral profiles 150, matching products 142 and features with behavioral profiles 150, and analyzing financial, operational, and other factors beyond basic customer behavior and product considerations that impact product design decisions by the vendor 140. The database 130 comprises the product usage database 132 that contains information about historic usage of products 142 and features of products 142.

The database 130 also comprises the customer information database 134 that identifies and describes customers 160. The information in the customer information database 134 comprises customer names, account numbers, account histories, addresses, distributors from whom customers 160 have previously purchased products 142, promotions responded to by customers 160, customer credit reports, and other account-related and other socio-economic and demographic data about customers 160 useful to the vendor 140. The database 130 also comprises the financial database 136 that stores revenue, cost, profitability, and other financial and operational information about products 142, features, and subscription plans sold by the vendor 140.

The vendor 140 sells products 142 and subscription plans to customers 160. In an embodiment wherein products 142 are mobile communications devices such as mobile telephones, the vendor 140 may be a cellular service provider that sells mobile telephones under license agreement with a manufacturer 170 with subscription services provided by the vendor 140. Subscription services may comprise cellular telephone service, Internet access via browser software installed on the product 142, short message service (SMS), also known as text messaging, calendaring, games, and other services. In an embodiment, the vendor 140 may also sell other products such as consumer electronic products, major appliances, shoes, vehicles, and apparel.

Products 142 are hardware, software, and services sold by the vendor 140. In an embodiment wherein products 142 are mobile communications devices such as mobile telephones, products 142 comprise the physical mobile telephone, software installed on the mobile telephone, subscription plans to services available on the mobile telephone, and any other facets of the offering including warranties and technical support.

Behavioral profiles 150 are collections of behavioral traits identified by observation of repeated customer behavior. Formation of behavioral profiles 150 is supported by the profile component 122 querying the product usage database 132 to discover persistent and well-established traits and behaviors by customers 160. Usage habits may suggest behavior traits, and, through the use of statistical and other analysis, behavior traits may be associated with each other. When about five or more behavior traits are identified and evidenced statistically, empirically, and/or anecdotally to occur together, the traits may be associated with each other and a behavioral profile 150 may be created. Five or more behavioral traits observed repeatedly together and collectively analyzed along with factual information from the customer information database 134 may allow the profile component 122 to assist in constructing a behavioral profile 150 of a typical customer 160 that may be receptive to a selected product 142 with specific features made prominently available. Typical behavioral profiles 150 for a vendor of mobile telephones may be a business user, teenager, and blue collar user. While a behavioral profile 150 is a collection of related behavioral traits evidenced by underlying habits, it is by no means certain that individual customers 160 associated with a given behavioral profile 150 have anything in common with each other except their usage habits. While it may be reasonable to conclude that people who use a mobile telephone in similar ways are similar to each other in other ways, this is not necessarily true. Behavioral patterns cut across cultural, socio-economic, demographic, and other lines used to traditionally divide customers 160. A teaching of the present disclosure is that habitual behaviors drive choice of products 142.

The behavioral profiles 150, 152, 154 are depicted in FIG. 1 as containing a plurality of customers 160. Customers 160 are not contained by, but are in fact, associated with behavioral profiles 150 by the product-profile matching component 124. In FIG. 1, customer 160 is depicted as being associated with the behavioral profile 150 along with customer 161 and customer 162. Customers 161 and 162 were found by the profile component 122 after its database querying and statistical analysis to share enough behavioral traits with each other and with customer 160 to be placed together, or associated with, behavioral profile 150. Customers 160, 161, and 162 may in fact reside in very different locations, have very different professions, and have very different political, religious, and cultural beliefs, but they have been determined to have the same or very similar usage habits, and are, hence, regarded by the present disclosure to belong in the same behavioral profile 150. At a later time, or after additional analysis, the customer 161, for example, may be found through its usage habits to actually exhibit behavioral traits similar instead to customers 166, 167, and 168 such that the customer 161 more appropriately may then be associated with the behavioral profile 154. The customer 161 may be shifted by the vendor 140 to behavioral profile 154 upon making this determination.

The behavioral profiles 150 are depicted in FIG. 1 as being external to the vendor 140 for discussion purposes. In reality, behavioral profiles 150 are conceptual designations to which customers 160 are associated. Behavioral profiles 150 may be electronic folders or other software objects stored on the product strategy server 110 or elsewhere within the control of the vendor 140.

Manufacturers 170 manufacture the product 142. In an embodiment, the vendor 140 is a provider of mobile communications services and does not manufacture the mobile telephones through which subscription services are offered.

The network 180 promotes communication between the components of the system 100. The network 180 may be any communication network including a public data network (PDN), a public switched telephone network (PSTN), a private network, and/or a combination thereof.

Figure 2:
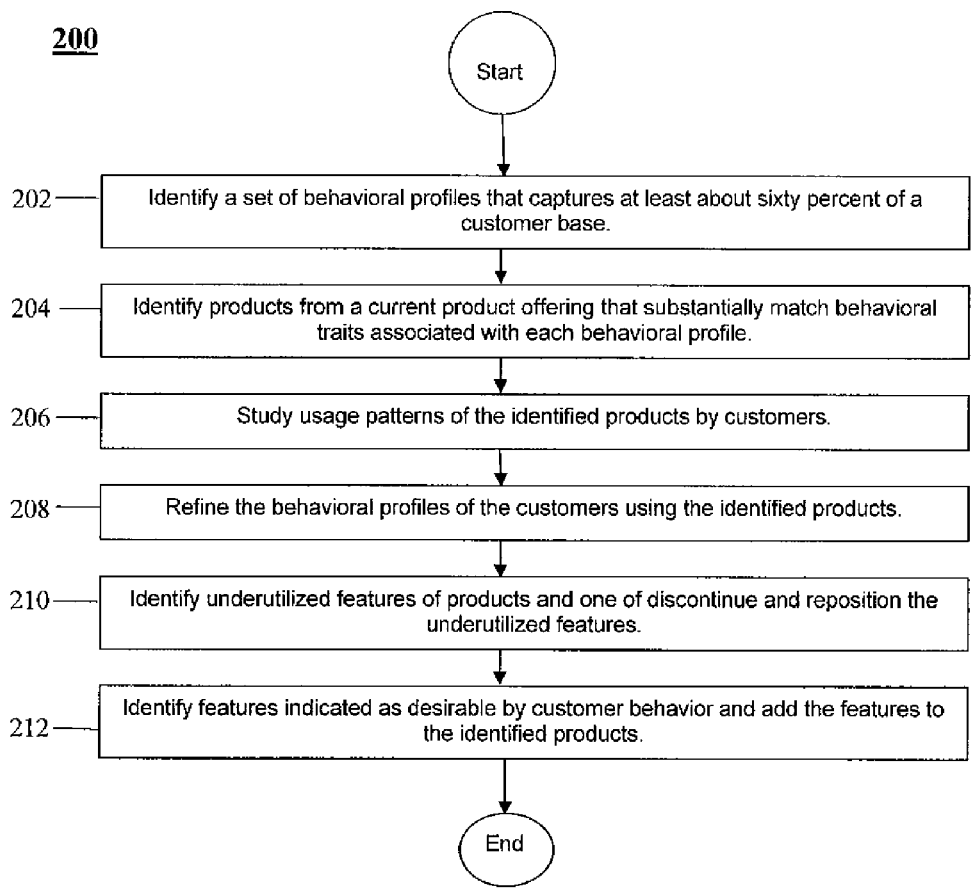
FIG. 2 is a flow chart illustrating a method according to an embodiment of the disclosure.

Turning now to FIG. 2, a method 200 for using customer behavior to set product strategy is provided. In an embodiment, at least portions of the method 200 may be performed by a computer program executing on a computer system. Beginning at block 202, the profile component 122 assists in identifying a set of behavioral profiles 150 that includes at least about sixty percent or about one sigma in a normal statistical distribution of a customer base. In an embodiment, behavioral profiles 150 may initially be created by human observation of customer behavior and later adjusted with input from the profile component 122. The method 200 seeks to observe, analyze, and categorize the usage behavior and habits of about sixty percent or about one sigma in a normal statistical distribution of the customer base of the vendor 140. As the methods and processes of the habituation oriented product selection system are applied, adjusted, and perfected with repeated use and perhaps broader application, the method 200 may be able to refine the behavioral profiles 150 to include a larger portion of the customer base. At block 202, the profile component 122 submits a series of queries to the product usage database 132 and other databases and performs statistical analyses to determine reliability of results. The profile component 122 then creates or supports the development of between five and ten behavioral profiles 150 comprising identified sets of behavioral traits exhibited by customers 160. Objectively observed behavioral traits are used to map customers to behavioral profiles 150.

In an example of the actions at block 202, a mobile telephone service provider could begin by developing ten preliminary behavioral profiles 150, 152, 154 of customers 160, the preliminary behavioral profiles 150, 152, 154 initially formulated by human observation. The preliminary behavioral profiles 150, 152, 154 might, for example, comprise professional males over the age of 40, professional males under the age of 40, males below the age of 22, females below the age of 30, as well as a plurality of other preliminary behavioral profiles 150, 152, 154 created from anecdotal evidence of customer behavior. The profile component 122 would then submit a series of queries to the database 130 and other databases searching for mobile telephone usage patterns and behavior traits linked to those preliminary behavioral profiles 150, 152, 154. This activity is directed toward developing preliminary behavior profiles 150, 152, 154, not associating products 142 with established behavioral profiles 150, 152, 154, a step that occurs later in the method 200. Information produced by the customer information database 134 may, for example, allow the development of more precise and refined behavioral profiles 150, 152, 154. The database 130 may produce usage information about females below the age of 30 that when regression analysis is performed on the data may reveal that there are material behavioral differences between females aged 10-17, 18-23, and 24-29. While anecdotal information and general perceptions about consumer behavior may suggest that all females below the age of 30 belong in a single behavioral profile 150, information in the customer information database 134 may suggest that females aged 10-17 use consumer products in very different ways than females aged 18-23 and females aged 24-29. Regression analysis on data drawn from the components of the database 130 may allow reliable correlations to be established that support a conclusion that females aged 10-17 should be associated with a behavioral profile 150 separate from females in other age groups. This behavioral profile 150 may be heavily weighted toward, for example, frequent usage of text messaging and downloading of music files but little access of Internet web sites providing live sports scores. It may be determined that other groups of individuals should belong with the same behavioral profile 150 who are not females aged 10-17 but who exhibit very similar usage behaviors. The present disclosure teaches associating customers 160 by their behaviors, not by their age or gender.

At block 204, the product-profile matching component 124 identifies products 142 and features within products 142 that best match specifically identified behavioral traits that have been gathered into behavioral profiles 150. This process may involve data processing and statistical analysis operations that discover associations between collections of behavioral traits and products 142 and features. Because products 142 are an aggregation and arrangement of features and attributes, identifying the correct grouping and arrangement of a small quantity of features that appeal to and are repeatedly used by users linked with a behavioral profile 150 is a basic step in the methods of the habituation oriented product selection system. Once behavioral profiles 150 have been established at block 202 and determined to be statistically reliable, at block 204 the product-profile matching component 124 performs its analysis and determines the products 142 and features that best suit each behavioral profile 150.

Continuing with the example previously provided, the products 142, 144, 146, 148 and their features are analyzed by the product-profile matching component 124 specifically in relation to the behavioral profile 150 identified for females aged 10-17 and others exhibiting substantially the same behaviors. Through the use of statistically associating model and feature usage with users in that behavioral profile 150, the several products 142 and features that are most commonly associated with the behavioral profile 150 may be identifiable. Analysis may show, for example, that certain features that were originally thought to be associated with the behavioral profile 150 are in fact more correctly associated with a different behavioral profile 152. An example of statistical analysis performed at block 204 may include searching for a correlation between increased age and decreased use of text messaging services. As females progress in age through their teens and from high school into college, they may use text messaging services less frequently and voice telephone or other communications services more frequently. Hypotheses such as this one could be supported or refuted by determining statistical correlation between advancing maturity and feature usage.

At block 206, usage patterns of the users of identified products 142 are studied by the vendor 140 through the use of the analysis component 126 and other tools that may not be components of the system 100. Relationships between customers 160 in groups associated with behavioral profiles 150 and usage patterns of products 142 become apparent and verifiable as statistically significant after analysis by the analysis component 126.

Continuing with the previous example, text message usage could be studied in detail by members of the previously identified behavioral profile 150, females aged 10-17 and others exhibiting associated behaviors. The frequency of text message use could be studied. The typical length of text message and types of file attachments, such as digital photographs, could be examined. Statistical analysis of text message usage could provide insights on any further segmentation within the behavioral profile 150 that might be valuable.

At block 208, behavioral profiles 150 are refined as the results of the actions at block 206 are analyzed. It may be discovered that one or more specific behavioral traits that were made part of a certain behavioral profile 150 in fact were associated in error with behavioral profile 150, and instead, should be associated with behavioral profile 152 or behavioral profile 154. A certain behavioral trait may be found after analysis to not be associated with any behavioral profile 150 at all, and after additional study, it may be determined that a behavioral trait was identified in error and that behaviors that were thought to constitute or signal a behavioral trait were, in fact, random in nature and are not of significance to the habituation oriented product selection system. In an embodiment, after observing the usage behavior of customers 160 assigned to a certain behavioral profile 150, it may be discovered that the behavioral profile 150 is partially or entirely invalid and may need to be adjusted or deleted.

In the example discussed previously, correlating text message usage with geographical data associated with users assigned to the behavioral profile 150 might reveal that females aged 10-17 residing rural areas are not heavy users of text messaging services and instead use mobile telephones primarily for voice telephone calls. This may represent a sharp departure from earlier findings. Such customers may be removed from the behavioral profile 150 and placed in a different behavioral profile 152, 154. Other analysis may alternatively reveal that mobile telephone users over the age of 55 in certain socioeconomic groups are using text messaging services at a noticeably increasing frequency and further segmentation of one or more behavioral profiles 150, 152, 154 associated with individuals over the age of 55 may be appropriate.

The process that takes place from block 202 through 208 of the method 200 is iterative in nature. The vendor 140 using the components of the product strategy application 120 may cycle through the steps of blocks 202 through 208 a plurality of times to build behavioral profiles 150 that are statistically reliable and relevant, have business value, and are otherwise constructed correctly.

At block 210, the product-profile matching component 124 and the analysis component 126 determine that certain features of products 142 are underutilized and may be discontinued, moved to other models of products 142, or eliminated entirely. As customers 160 typically repeatedly use only a few of the many features of the product 142, features that a customer 160 does not regularly or ever use may be reduced in prominence on the interface of a product 142 or eliminated. Unused features may very well be viewed by the customer 160 as an impediment with no value or negative value and hence may be considered by the vendor 140 as candidates for repositioning or elimination.

In the example discussed in the method 200, it was determined through statistical analysis that text messaging services are heavily used by customers 160 in the behavioral profile 150, individuals that are predominantly female and aged 10-17 years old. Analysis may also show that messaging services that constantly send college and professional football scores to these customers 160 are not desirable and are in fact viewed by these customers 160 as an annoyance and a detriment to the quality of the overall product 142. Statistical analysis that examines usage of the product 142 on Saturdays, Sundays, and Monday evenings between September and January by customers 160 assigned to the behavioral profile 150 would support a conclusion that this particular messaging service should be eliminated as a feature of products 142 used by these customers 160.

At block 212, the product-profile matching component 124 and the analysis component 126 determine through observation of customer behavior that while one or more models of product 142 have been properly aligned with behavioral profiles 150, the products 142 presently lack features that may be wanted by the customers 160 in behavioral profiles 150 using the products 142. This phenomenon may become apparent by observing customers 160 accessing features or information inappropriately or in irregular or not optimal fashion on their otherwise correctly aligned products 142 to achieve functionality or access information not directly available on their product 142 with which they are otherwise satisfied. At block 212, features are added to products 142 that have been indicated by customers 160 as desired additions to these products 142.

Concluding the example accompanying the method 200, if for some reason the messaging service providing college and professional football scores was not previously included in the service package made available to users associated with a behavioral profile 150, 152, 154 that included males aged 23-49, statistical analysis of usage patterns could determine that this may be a valuable service to add to the service package heavily purchased by users associated with this behavioral profile 150. The Internet searching behavior of these users may have been examined on Saturdays, Sundays, and Monday evenings between September and January and it could be observed that popular Internet sites providing sports scores are being heavily accessed during these times but not at other times. It might also be determined that males aged 23-49 are phoning heavily into sports information services during these periods. It may be demonstrated with a high degree of statistical reliability that this service should be offered and made prominent to users associated with behavioral profiles 150, 152, 154 that include males aged 23-49.

Figure 3:
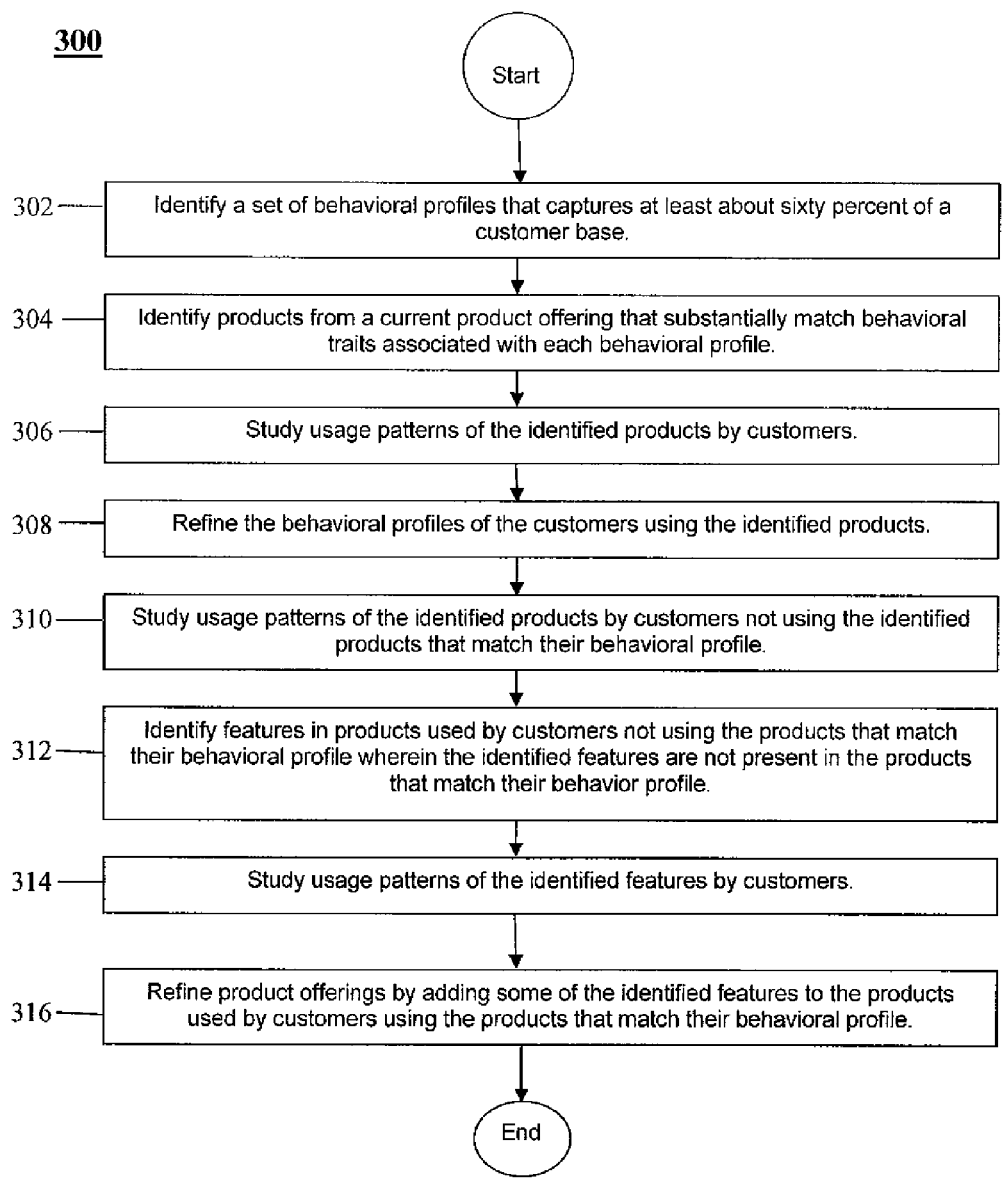
FIG. 3 is a flow chart illustrating another method according to an embodiment of the disclosure.

Turning now to FIG. 3, a method 300 is provided for further using customer behavior to set product strategy that examines customers 160 associated with a certain behavioral profile 150 but who for unknown reasons are using products 142 that do not match the behavioral profile 150. In an embodiment, at least portions of the method 300 may be performed by a computer program executing on a computer system. In an embodiment, whereas most customers 160 are using the product or products 142 that are aligned with the behavior profile 150 to which the customers 160 have been associated, one or a few customers 160 who also have been assigned to that same behavioral profile 150 may choose to use some other model of product 142, a model that has been aligned by the product-profile matching component 124 to a different behavioral profile 152 or 154. While this product 142 choice might be viewed as aberrant and of no value, a pattern of this behavior by several customers 160 who otherwise are solidly associated with behavioral profile 150 may provide valuable insights.

Blocks 302 through 308 of the method 300 are substantially identical to blocks 202 through 208 of the method 200. The same steps of determining behavioral profiles 150, matching products 142 with behavioral profiles 150, studying the usage patterns by customer 160 of products 142 to determine if products 142 have been properly aligned with behavioral profiles 150, and if not, adjusting product 142 alignment, behavioral profiles 150, or both, and finally, of performing further refinements of behavioral profiles 150 are followed as in the method 200. Once these steps, and possibly several iterations of these steps have been completed, the method 300 may proceed to block 310.

At block 310, the analysis component 126 of the product strategy application 120 searches for instances of a customer 160 using a product 142 that does not align with the behavioral profile 150 to which the customer 160 was associated by the profile component 122. This observed behavior may be a bona fide case of a customer 160 validly and correctly associated with a behavioral profile 150 choosing to use a product 142 not matched with the behavioral profile 150 for one or more unknown reasons. The observed behavior may alternatively be the result of the customer 160 being associated with the wrong behavioral profile 150 and further iterations of the steps in blocks 302 through 308 and perfecting of the components of the product strategy application 120 may reduce instances of these errors. The method 300 is concerned with the former instance when a pattern of several or more customers 160 correctly associated with one behavioral profile 150 choose to use a product 142 that has been aligned with a different behavioral profile 152 or 154. At block 310, these instances of departure from norms as determined in the steps of blocks 302 through 308 are identified and studied.

At block 312, the analysis component 126 examines bona fide cases identified at block 310 of a customer 160 validly and correctly associated with a behavioral profile 150 choosing to use a product 142 not matched with the behavioral profile 150. The analysis component 126 at block 312 attempts to identify one or more specific features in the non-matching product 142 chosen that are not present in the product 142 that matches the behavioral profile 150 for that customer 160. At block 314, the usage of such features are studied as there may be business value to this process. Inferences that may be drawn from customers 160 using products 142 that do not match the behavioral profiles 150 include the maturation or leveling off of a product 142 in its growth or market penetration. Inferences may also be drawn about the evolution of the subject product 142, i.e., the direction in which the product 142 in view of the observed unusual behavior by a few maverick customers 160.

The analysis component 126 selects these exceptional cases when it detects at least several instances of this unusual behavior occurring. For example, the customer 165 may have validly and correctly been associated with behavioral profile 152 by the profile component 122 and the product 146 may have been matched by the product-profile matching component 124 with the behavioral profile 152. In the example, customers 163 and 164 are as projected by the product strategy application 120 using the product 146 but for unexplained reasons the customer 165 has chosen to use product 148 instead of product 146. Product 148 may have been aligned with a different behavioral profile, for example behavioral profile 150 or 154. In the method 300, the analysis component 126 may seek to determine why the customer 165 has chosen to use product 148 instead of product 146. Analysis may suggest that product 148 has a feature that product 146 does not have that the customer 165 may find useful and valuable. While customer 165 might otherwise like product 146 and find it satisfactory, that one feature in product 148 that is not contained in product 146 may be important enough to customer 165 that the customer 165 makes the decision to use product 148 instead of product 146 that it otherwise finds satisfactory. If the analysis component 126 detects enough instances of this kind of crossover behavior occurring, it might determine that the one particular feature enjoyed by the customer 165 in product 148 that is not in product 146 needs to be added to product 146. A potentially significant benefit of adding the feature from product 148 into product 146 is that customers 163 and 164, who may not be aware of the value of the feature coming from product 148 or may not even be aware of the feature's existence at all, may discover that when that feature is added to the product 146 they have been using, their enjoyment of the product 146 is materially enhanced and their loyalty to the product 146 and by connection the vendor 140 is strengthened.

While this example just presented is simple, it illustrates the importance of determining and placing the correct features into a model of product 146 that has otherwise been correctly aligned with a behavioral profile 152. The analysis component 126 discovered an instance of a feature not existing in a certain model of product 146 that after analysis was found to correctly belong in product 146. After the feature was placed into product 146, results showed that customers 163 and 164, who previously were unaware of that feature, emerged from the process with strengthened product and vendor loyalty.

At block 316, the vendor 140 executes the feature change discovered to be beneficial at block 312. In the example given, this action would constitute adding the feature found by the maverick customer 165 in product 148 to product 146.

The method 300 describes a process wherein the analysis component 126 recommends the addition of a feature found to be valuable in one product 148 to another product 146. When the analysis component 126 conducts this analysis, before arriving at conclusions and recommendations to furnish to the vendor 140, it also may draw on information in the customer information database 134 about who and where customers 160 are, the types of accounts those customers 160 have with the vendor 140, and how they acquired their products 142, i.e., directly from the vendor 140 or through a distributor channel of the vendor 140. The analysis component 126 in conducting this analysis may also draw on information in the financial database 136 regarding historic cost and revenue data regarding models of products 142 and features and costs of distribution of features and other financial considerations related to feature changes. For example, customer and product analysis may show that it is advisable from a customer satisfaction point of view to delete an unused feature from a model of a product 148 and move it to a product 146. However, cost data found in the financial database 136 may reveal that making such a feature transition is prohibitively expense for one or more reasons and such a feature change as proposed should not be undertaken. All factors, including financial and customer 160 location and relationship factors, are preferably taken into account in addition to customer usage factors when feature and other product changes are being considered.

Figure 4:
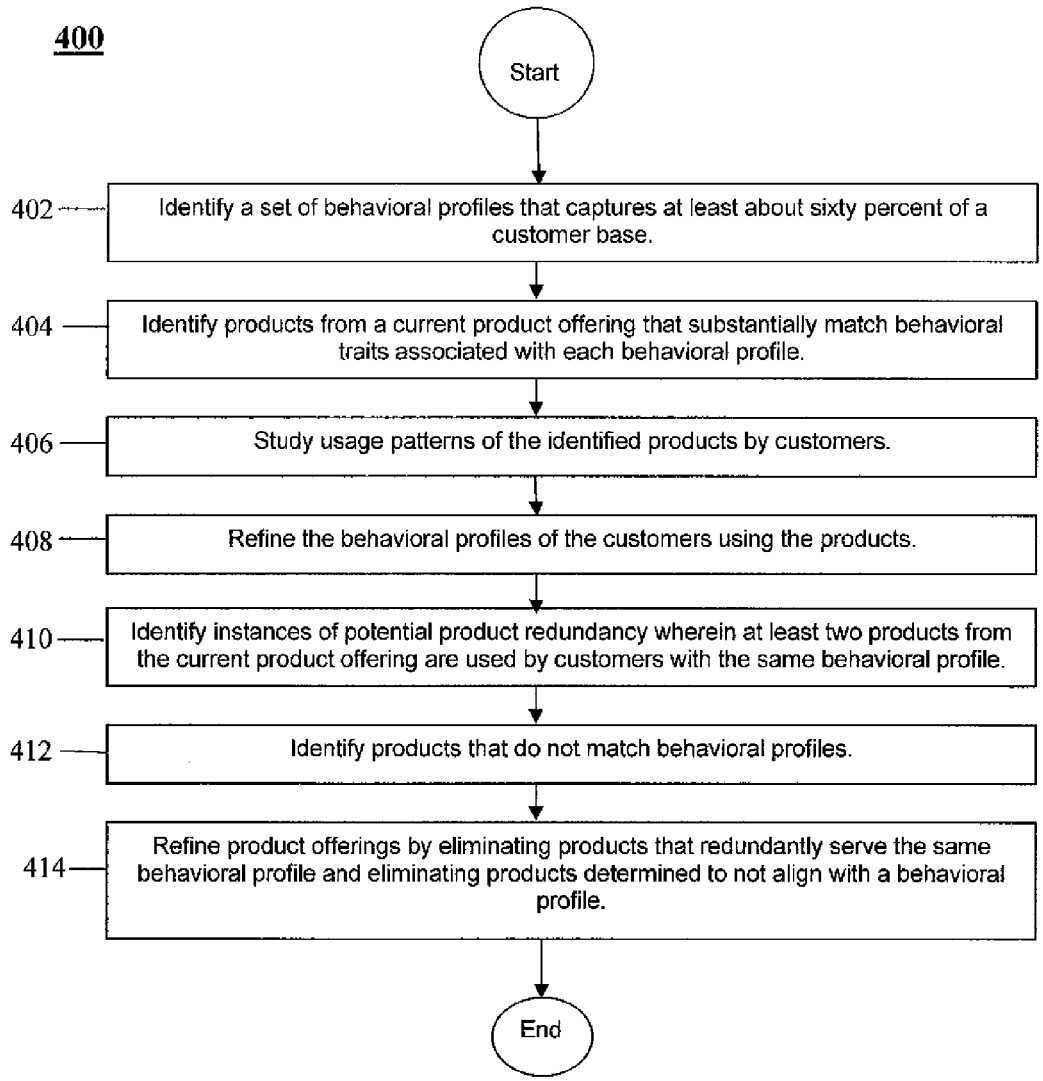
FIG. 4 is a flow chart illustrating another method according to an embodiment of the disclosure.

Turning now to FIG. 4, a method 400 for using customer behavior to set product strategy is described wherein instances of two or more products 142 are properly aligned but may be redundant in serving customers 160 associated with the same behavioral profile 150. In an embodiment, at least portions of the method 400 may be performed by a computer program executing on a computer system. The method 400 also describes situations in which one or more products 142 are not aligned satisfactorily at all to a behavioral profile 150. Those products 142 may become subjects of discussion regarding repositioning or outright elimination. Vendors 140 of mobile electronic products including mobile telephones may serve a variety of perceived customer segments and may do so by selling a broad range of product models, each model providing many features. In some cases, in an effort to not leave portions of its customer base underserved or not served, and therefore, vulnerable to competitors, a vendor 140 may unintentionally overly serve its customers 160 with too many products 142 that overlap each other with features or with products 142 offering features far in excess of what a typical customer 160 may want or need. Providing too broad or crowded a range of products 142 may confuse customers 160 and blur the public image that a vendor 140 wishes to cultivate with its customer base, as well as the business community and general public, about the overall business and corporate mission of the vendor 140. A customer base, distributor networks, manufacturers 170, 172, as well as secondary, but important parties such as consultants, journalists, industry pundits, trade regulators, intellectual property litigators, and others often look at the product line of a vendor 140 for how products 142 are positioned for indicators of upgrade and evolution paths of products 142 and for signals about the technical and business directions of a vendor 140. A product line that appears crowded may cause customers 160 and others to conclude that a vendor 140 is struggling to find direction in its markets. These perceptions and the impact that a crowded, cluttered, or poorly positioned product line may have on the quality of the sales and support functions of a vendor 140 may negatively impact customer retention.

Blocks 402 through 408 of the method 400 are substantially identical to blocks 302 through 308 of the method 300 as well as blocks 202 through 208 of the method 200. The same steps of determining behavioral profiles 150, matching products 142 with behavioral profiles 150, studying the usage patterns by customer 160 of products 142 to determine if products 142 have been properly aligned with behavioral profiles 150, and if not, adjusting product 142 alignment, behavioral profiles 150, or both, and finally, of performing further refinements of behavioral profiles 150 may be followed as in the methods 200 and 300. Once these steps, and possibly several iterations of these steps have been completed, the method 400 may proceed to block 410.

At block 410, the analysis component 126 examines situations in which at least two products 142 are aligned with the same behavioral profile 150 after the produbt-profile matching component 124 completes its analysis and determines how products 142 are matched with behavioral profiles 150. The analysis component 126 focuses on each behavioral profile 150 individually and examines which products 142 are used by customers 160 associated with the behavioral profile 150. When two or more products 142 are used by customers 160 associated with a single behavioral profile 150, the distribution of the products 142 across the behavioral profile 150 is examined. If a very large majority of customers 160 associated with a behavioral profile 150 uses a single product 142, the product 142 may be properly positioned with the behavioral profile 150 and it may not be useful to examine why the remainder of customers 160 associated with the behavioral profile 150 use a different product. If two products 142, 144 are chosen almost equally by customers 160 associated with a single behavioral profile 150, analysis of feature use and other differences between the two products 142, 144 as well as any differences in behavioral traits exhibited by the two segments of the behavioral profile 150 may be informative. As with the methods 200 and 300 wherein the possibility arose that the problem may lie with the composition of the behavioral profile 150, with the method 400, the same risk exists that an underlying behavioral profile 150 may have been incorrectly constructed by the profile component 122 before the product-profile matching component 124 began its process of matching products 142 to behavioral profiles 150. As with the methods 200 and 300, the method 400 assumes this is not the case and that behavioral profiles 150 have been soundly constructed.

While two models of product 142 aligned with the same behavioral profile 150 may after analysis be determined to be a case of two products 142 redundantly serving the same customer 160 base, the two models may offer different features that appeal differently to customers 160 in the same behavioral profile 150. The features that appeal differently may not be functional features, but rather aesthetic features such as the shape, weight, or feel of the product 142 in the hand of the customer 160, or other features such as price or terms. A vendor 140 seeks to avoid alienating a segment of customers 160 by eliminating a model of product 142, for example, by eliminating what may appear to be a redundant product 142, when, in fact, that product 142 does actually appeal to a specific portion of customers 160 within a behavioral profile 150. This risk highlights the importance of constructing behavioral profiles 150 correctly at the beginning before product 142 alignment decisions are made. The analysis component 126 is able to consider the more obvious feature overlap factors as well as considerations not related to functionality such as styling and aesthetics that may be very important to customers 160 using personal products 142 such as mobile telephones. The analysis component 126 also considers financial and operational factors that call for it to draw information from the customer information database 134 and the financial database 136. Two models of product 142 with very similar features may be properly aligned with a single, correctly constructed behavioral profile 150, but for one or more specific reasons both models of product 142 are highly profitable to the vendor 140. The analysis component 126 would draw heavily on the financial database 136 to perform sensitivity analyses to determine the impact on profitability when reductions of products 142 are being considered. If a model of product 142 at block 410 appears to be redundant with another model such that the customers 160 using the model under consideration for elimination, may be shifted without significant disruption to another model, the result to the vendor 140 may be a significant cost savings. In cases wherein models of product 142 are being considered for elimination or gradual phase out, the analysis component 126 may consider all factors including the impact on customers 160 and the impact on customer retention, costs, and profitability.

At block 412, the analysis component 126 also identifies products that do not match any behavioral profile 150. In some instances, the product-profile matching component 124 may not be able to find any statistical linkage between a product 142 and any behavioral profile 150. When this is the case, the lack of fit that the product 142 has with any identifiable segment of customers 160 may already be apparent to the vendor 140 as evidenced by erratic revenue performance or profitability exhibited by the product 142. A product 142 that does not align with or match any behavioral profile 150 may also have unusual characteristics such as being very inexpensive, very expensive, or being a niche product with popularity for cultural or other reasons having little to do with features or functionality. As with situations wherein two or more products 142 align with the same behavioral profile 150, decisions to eliminate a product 142 that does not align with any behavioral profile 150 are not taken by the vendor 140 without carefully considering the output of the analysis component 126 and customer retention implications. This output accounts for financial and business factors along with the alignment of the product 142 to a behavioral profile 150.

At block 414, the vendor 142 using the results provided by the analysis component 126 and other components of the product strategy application 120 refines its product 142 offerings by eliminating products 142 that redundantly serve the same behavioral profile 150 and products 142 determined to not align with a behavioral profile 150. When all of the factors identified by the analysis component 126 have been considered, eliminating redundant and non-aligning products 142 may achieve the desired result of boosting the profitability of the product line, improving the focus of individual products 142 on customer 160 segments, making clearer the public image of the product 142 line and the vendor 140, and increasing customer retention.

Figure 5:
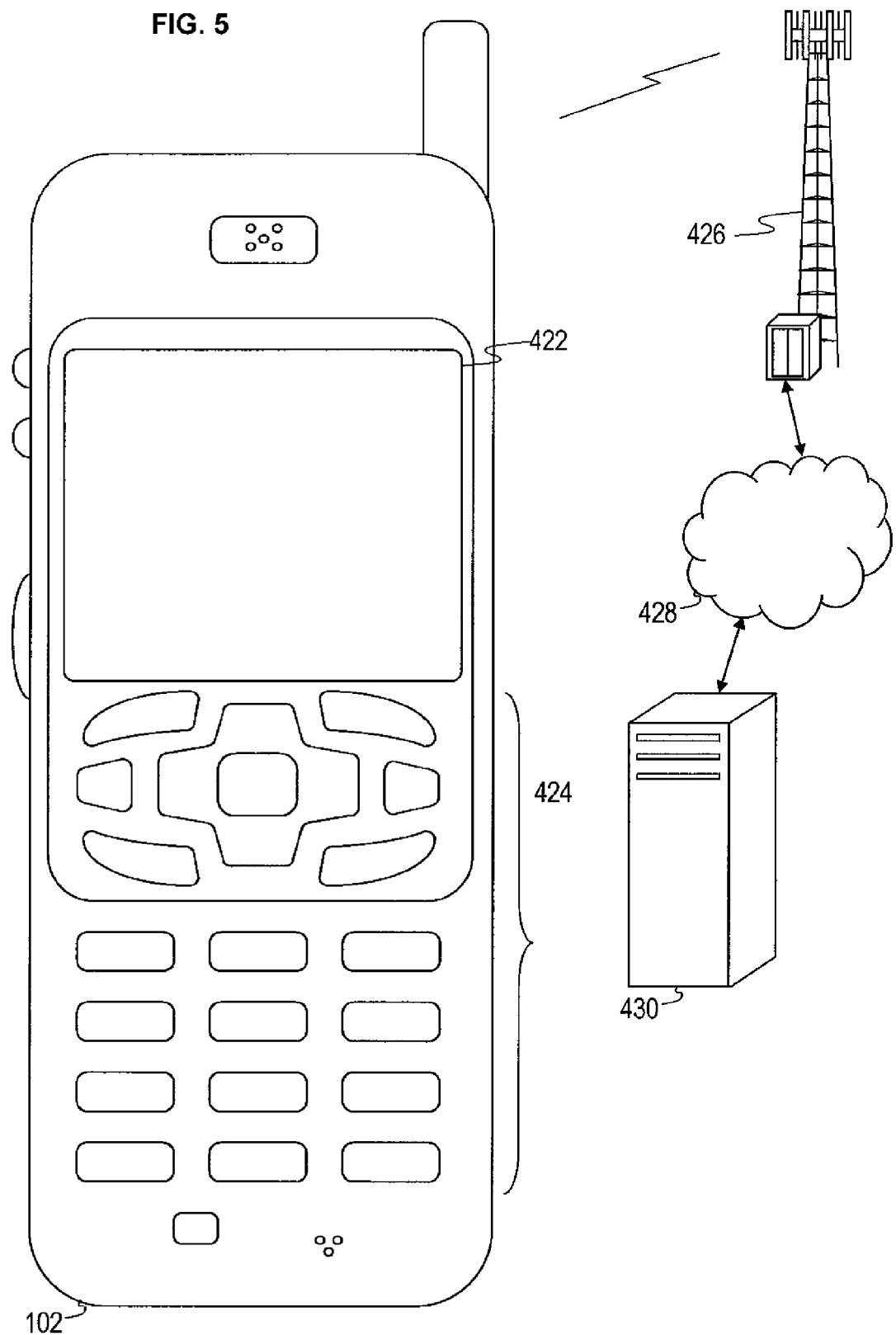
FIG. 5 is an illustration of a mobile device according to an embodiment of the disclosure.

FIG. 5 shows a wireless communications system including the mobile device 102. In an embodiment, the mobile device 102 is equivalent to the communications device 110. FIG. 5 depicts the mobile device 102, which is operable for implementing aspects of the present disclosure, but the present disclosure should not be limited to these implementations. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 422 and a touch-sensitive surface or keys 424 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

The mobile device 102 may execute a web browser application which enables the display 422 to show a web page. The web page may be obtained via wireless communications with a base transceiver station (BTS) 426, a wireless network access node, a peer mobile device 102 or any other wireless communication network or system. While a single base transceiver station 426 is illustrated, it is understood that the wireless communication system may comprise additional base transceiver stations. In some instances, the mobile device 102 may be in communication with multiple base transceiver stations 426 at the same time. The base transceiver station 426 (or wireless network access node) is coupled to a wired network 428, such as the Internet. Via the wireless link and the wired network, the mobile device 102 has access to information on various servers, such as a server 430. The server 430 may provide content that may be shown on the display 422. Alternately, the mobile device 102 may access the base transceiver station 426 through a peer mobile device 102 acting as an intermediary, in a relay type or hop type of connection.

FIG. 6 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby handsets and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

FIG. 7 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the mobile device 102. Also shown in FIG. 7 are a web browser application 608, a media player application 610, and JAVA applets 612. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality.

Figure 8:
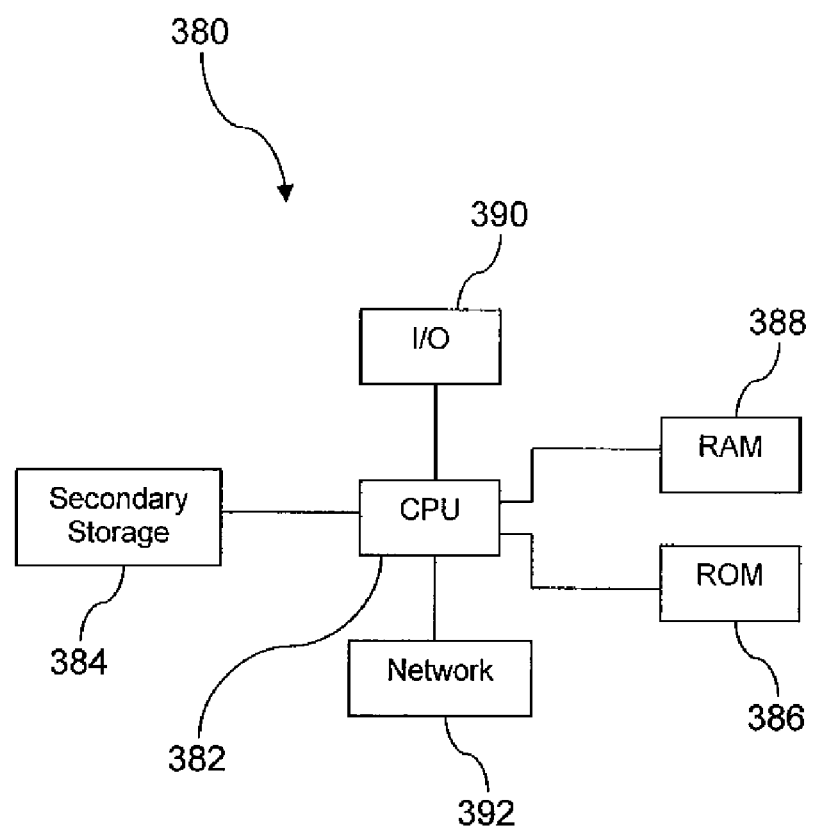
FIG. 8 illustrates an exemplary general purpose computer system suitable for implementing some aspects of the several embodiments of the disclosure.

Some aspects of the system described above may be implemented on any general-purpose computer with sufficient processing power, memory resources, and network throughput capability to handle the necessary workload placed upon it. FIG. 8 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A processor-implemented method executing on a computer system for using customer behavior to implement product design, comprising:
   the computer system identifying a set of behavioral profiles that captures at least about sixty percent of a customer base;
   the computer system identifying products from a current product offering that substantially match behavioral traits associated with the behavioral profiles;
   the computer system studying usage patterns of the identified products by customers, wherein the usage patterns are those of a plurality of customers using the products;
   the computer system refining the behavioral profiles using the usage patterns;
   the computer system identifying underutilized features of the identified products based on the usage patterns and one of discontinuing and repositioning the underutilized features; and
   the computer system identifying features indicated as desirable by customer behavior based on the usage patterns and adding the features to the identified products;
   wherein the products comprise at least one of a consumer electronic device, software executing on the consumer electronic device, and services associated with the use of the consumer electronic device or software executing on the consumer electronic device.

2. The method of claim 1, wherein the consumer electronic devices comprise televisions, personal computers, and portable electronic devices.

3. The method of claim 1, wherein the identified products are mobile communications devices and subscription services associated with the mobile communications devices.

4. The method of claim 1, wherein behavioral profiles are based on traits indicated by customer usage patterns and habits.

5. The method of claim 4, wherein customer usage patterns and habits concern repeated behaviors by customers independent of a specific model of product and subscription service used.

6. The method of claim 4, wherein customer usage patterns and habits differ from tastes and preferences expressed by customers in questionnaire and survey input.

7. The method of claim 1, wherein between five and ten behavioral profiles are identified.

8. A processor-implemented method executing on a computer system, comprising:
   the computer system identifying a set of behavioral profiles that captures at least about sixty percent of a customer base;
   the computer system identifying products from a current product offering that substantially match behavioral traits associated with the behavioral profiles;
   the computer system studying usage patterns of the products by customers, wherein usage patterns are those of a plurality of customers using the products;
   the computer system refining the behavioral profiles using the usage patterns;
   the computer system studying usage patterns of the identified products by customers not using the identified products that match their behavioral profile;
   the computer system identifying features in products used by customers not using the products that match their behavioral profile, wherein the identified features are not present in the products that match their behavior profile;
   the computer system studying the usage of the features; and
   the computer system refining product offerings by adding some of the identified features to the products used by customers using the products that match their behavioral profile;
   wherein the products comprise at least one of hardware, software executing on the hardware, and services associated with the use of the products.

9. The method of claim 8, wherein queries are submitted to customer usage databases to identify customers using products not matching their behavioral profiles.

10. The method of claim 8, wherein usage of products by customers associated with behavioral profiles not matching the products is studied for product upgrade and product evolution implications.

11. The method of claim 10, wherein features in products used by customers associated with behavioral profiles not matching the products are studied for feature upgrade and feature evolution implications.

12. The method of claim 8, wherein products are positioned to align directly with established customer usage habits without one of disrupting and changing established customer usage habits.

13. The method of claim 8, wherein a set of behavioral profiles is created based on observing patterns and habits of customer product usage.

14. The method of claim 8, wherein products and features are targeted at customers' established habitual usage behaviors.

15. A processor-implemented method executing on a computer system, comprising:
   the computer system identifying a set of behavioral profiles that captures at least about sixty percent of a customer base;
   the computer system identifying products from a current product offering that substantially match behavioral traits associated with the behavioral profiles;
   the computer system studying usage patterns of the products by customers, wherein usage patterns are those of a plurality of customers using the products;
   the computer system refining the behavioral profiles using the usage patterns;
   the computer system identifying instances of potential product redundancy wherein at least two products from the current product offering are used by customers with the same behavioral profile;
   the computer system identifying products that do not match behavioral profiles; and
   the computer system refining product offerings by eliminating all but at least one of the products that redundantly serve the same behavioral profile and eliminating products determined to not align with a behavioral profile;
   wherein the products comprise at least one of hardware, software executing on the hardware, and services associated with the use of the products.

16. The method of claim 15, wherein instances of product redundancy occur when at least two products from a product offering are used by customers associated with the same behavioral profile.

17. The method of claim 15, wherein product offerings aligned with behavioral profiles include subscription plans for services associated with the product offerings.

18. The method of claim 15, wherein subscription plans are associated with product pricing.

19. The method of claim 15, wherein the method aligns product functionality strengths with behavioral profiles.

20. The method of claim 15, further including designing products that align to customer usage habits based on behavioral profiles.

* * * * *